United States Patent [19]

Vollmer

[11] Patent Number: 5,161,820
[45] Date of Patent: Nov. 10, 1992

[54] INFLATABLE AIR BAG SAFETY DEVICE FOR MOTOR VEHICLES

[75] Inventor: Elmer Vollmer, Wettstetten, Fed. Rep. of Germany

[73] Assignee: Audi AG, Ingolstadt, Fed. Rep. of Germany

[21] Appl. No.: 703,689

[22] Filed: May 21, 1991

[30] Foreign Application Priority Data

May 23, 1990 [DE] Fed. Rep. of Germany ....... 4016610

[51] Int. Cl.$^5$ ...................... B60R 21/22; B60K 28/00
[52] U.S. Cl. .................................. 280/730; 280/732; 280/735; 180/273; 340/666; 340/667
[58] Field of Search .............. 280/730, 731, 732, 735; 180/273, 272; 340/666, 667

[56] References Cited

U.S. PATENT DOCUMENTS

| | | | |
|---|---|---|---|
| 3,672,699 | 6/1972 | De Windt | 180/273 |
| 4,796,013 | 11/1989 | Yasuda et al. | 180/272 |
| 5,071,160 | 12/1991 | White et al. | 280/731 |
| 5,074,583 | 12/1991 | Fujita et al. | 280/730 |

FOREIGN PATENT DOCUMENTS

| | | |
|---|---|---|
| 0357225 | 3/1990 | European Pat. Off. ............ 280/730 |
| 2134590 | 1/1972 | Fed. Rep. of Germany . |
| 2516185 | 10/1975 | Fed. Rep. of Germany . |
| 3635644 | 4/1987 | Fed. Rep. of Germany . |
| 3702825 | 8/1988 | Fed. Rep. of Germany . |
| 3802159 | 8/1989 | Fed. Rep. of Germany . |
| 3805887 | 9/1989 | Fed. Rep. of Germany . |
| 3809074 | 10/1989 | Fed. Rep. of Germany . |

Primary Examiner—Charles A. Marmor
Assistant Examiner—Paul Dickson
Attorney, Agent, or Firm—Jacques M. Dulin; Thomas C. Feix

[57] ABSTRACT

An improved inflatable passenger side air bag safety device for motor vehicles for detecting the presence or absence of a passenger positioned on or in front of a particular passenger vehicle seat. The safety device comprises a control unit for the intelligent triggering of the propellant charge for the air bag when a triggering event is detected, such as an impending collision, and the presence of a passenger is also detected. The control unit receives signals from a pair of switches, electrically connected in parallel to one another, including a first seat switch for detecting the presence or absence of a sitting passenger and a second foot switch for detecting the presence or absence of a standing, kneeling, or sitting passenger in the region in front of the vehicle seat. In the preferred embodiment both switches are flat, contact type switches, each having a broad surface area and are activated when subjected to the weight of a passenger from above. An acceleration sensor is also connected to the control unit for signaling the event of an impending collision. In an alternate embodiment the foot switch is a condenser-type switch in the form of a metallic screen interwoven within the floor carpet and detects fluctuations in the magnetic and electric fields corresponding to the presence or absence of a passenger positioned over the floor carpet. The air bag associated with the vehicle seat is caused to be activated during a triggering event if either of the seats switch and/or foot switch are activated by a passenger.

16 Claims, 1 Drawing Sheet

INFLATABLE AIR BAG SAFETY DEVICE FOR MOTOR VEHICLES

FIELD

The invention relates in general to an improved safety device for triggering a passenger side air bag. More particularly, the invention relates to an improved passenger side air bag safety device wherein two sensors are provided to detect the presence of the passenger, including a first sensor located in the passenger seat for detecting the presence or absence of a seated passenger and a second sensor located under the floor carpet adjacent the passenger's foot area to detect the presence of a passenger who might be standing, kneeling or sitting on the floor board area in front of the passenger seat. Both sensors are electrically connected in parallel to a control unit which also receives a signal from an acceleration sensor which detects an impending collision. The control unit triggers the passenger side inflatable air bag when it has received a signal from the acceleration sensor and a definite signal from the seat and/or foot sensor.

BACKGROUND

It is known in the prior art to provide a driver's side inflatable air bag and place it within the steering wheel underneath an impact plate. It is also known from the prior art to provide an inflatable air bag for the other passenger seats, and in particular, the front passenger seat, whereby the passenger side air bag is inflated by ignition of a propellant charge, which is triggered by a signal detected by a known acceleration sensor whenever there is a heavy impact experienced.

A disadvantage which arises with current state of the art passenger side air bags is the triggering of an air bag when the passenger seat is not occupied. A needlessly inflated air bag creates a sudden pressure wave within the passenger compartment, which may be harmful to the driver and other passengers. Furthermore, when a passenger side air bag is inflated in the absence of a passenger to be protected, considerable and unnecessary repair or replacement costs result in order to restore the system. This is especially true if the passenger side air bag has been integrated with other vehicle parts, (e.g., as the dashboard) and the parts are torn off or broken at pre-determined breaking points. Thus, it becomes very costly to repair the car interior after the inflatable air bag has been used. In the event of a minor accident with a modest repair cost, a needless triggering of a passenger side air bag may make the cost of repair so high that it may be more economical to consider the vehicle as totalled.

The prior art is replete with methods to control the triggering of a passenger side air bag so that it is inflated only when the passenger may benefit from its use. It is known from DE-OS 21 34 590 and DE-OS 37 02 825 how to arrange a seat contact switch exposed on the passenger seat so that the switch responds mechanically to the weight of a seated passenger in order to detect the presence or absence of a passenger on that particular seat. Each seat contact switch is connected to a control unit which controls the triggering of each air bag such that the air bag for a particular passenger is only triggered when that passenger has been detected on the seat by the appropriate seat contact switch.

A safety device having a seat contact switch of the above type is also known from DE-OS 25 16 185. This known safety device discloses a seat contact switch which is used to detect an empty seat, whereby the associated air bag is still triggered, but is only partially inflated, thus posing a lesser risk of sudden-pressure and related safety problems associated with the needless inflation of an unused air bag.

From the above described prior art safety systems, it becomes evident that two operating conditions must be simultaneously satisfied for the useful activation of the passenger side air bag. First, there must exist an appropriate level of severity of an accident such that the acceleration sensor will send a signal which has exceeded a pre-set threshold value to the control unit which controls the triggering of the passenger side air bag. And second, a passenger must physically occupy the particular passenger seat in order to activate the seat contact switch and send the signal corresponding to "seat occupied condition" to the control unit so that it knows that all conditions are satisfied to inflate the air bag.

A common disadvantage with the above described methods exists since, in many instances, the seat contact switch does not respond to the presence of a passenger when that passenger is standing (such is often the case with children), kneeling on the floor, or sitting in a forward portion of his seat. When the seat switch does not respond, the air bag is not triggered by an impact, thus rendering the protective system ineffective.

DE-PS 38 05 887 teaches to provide a seat contact switch which is mechanically activated by the body weight of a sitting person whereby the seat switch may detect the body weight of a person as he shifts his weight over a broad area of the seat surface. The seat contact switch comprises a sandwich-type switch mat, having a pair of spaced contact layers which are separated by an elastically deformable, electrically insulating intermediate layer. This intermediate layer, being electrically conductive in the vertical direction, completes the circuit between the two contact layers as it is elastically deformed (compressed) when under the influence of the body weight of a seated person.

Seat switches of non-contact operation are also known in the prior art and are disclosed in DE-OS 36 35 644 wherein the seat switches comprise a condenser having two electrodes opposite to each other on the seat, such that an electrical field is set up between them. The capacity of the condenser changes with respect the presence or absence of a person on the seat. By sensing this capacity change, it is possible to detect the presence or absence of a person on the seat It is also known from DE-OS 38 09 074 how to determine various sitting positions or the position of the center of gravity of the seated passenger, such as in a forward bending position, by placing several known pressure sensors in a pre-selected arrangement on the seat. This German patent document also teaches how to activate and inflate an associated air bag in accordance with the particular sitting position of the seated passenger.

In another known device for recognizing whether a vehicle seat is occupied or not, a distance measuring sensor is used instead of a seat switch to detect the presence of a passenger. This type of distance measuring sensor is typically provided on the dashboard and uses a radar-type method wherein a pulse is emitted in a direction towards the seated passenger and/or seat back. The pulse and echo are then reflected back either by the seat back (if the seat is empty) or by the stomach or chest region of the passenger (if the seat is occupied). The distance between the dashboard and the seat back or passenger is calculated from the pulse-echo travel time process and thus, the presence or absence of a person in the vehicle seat can be determined. This information is then used to determine whether or not the air bag for the passenger seat should be activated. This method requires the use of additional sensors to determine the particular position of a seat to account for horizontal fore-aft adjustment and angular tilt of the seat back. While this type of pulse-echo travel time process makes it possible to determine whether the region in front of the seat is occupied by a standing, kneeling, or sitting person, (while the traditional seat sensor would indicate the seat as empty), it is very costly to implement in view of the large manufacturing and installation expenses associated with the many seat location sensors involved.

Thus, there is a significant need in the art to provide a simple and low cost safety device for passenger side inflatable air bags to detect a passenger irrespective of whether the passenger is seated or positioned in front of the passenger seat. There is also a need in the art for an improved safety detection device which is able to distinguish between the presence of a passenger from luggage or other objects placed in front of or on the passenger seat, so that the inadvertent activation of the passenger side air bag is not caused to occur.

THE INVENTION

Objects

It is among the objects of the invention to provide a safety device for passenger side inflatable air bags which is able to detect the presence or absence of a passenger seated on or positioned in front of the passenger seat;

It is another object of the invention to provide an improved safety device for passenger side inflatable air bag whereby two sensors are connected in parallel, including a first sensor associated with the passenger seat and second sensor associated with the floor mat area in front of the passenger seat and in which either sensor will detect the presence of a passenger independently of the other sensor;

It is another object of the invention to provide an improved safety device for passenger side inflatable air bags, whereby the safety device is simple to operate and can be implemented for low cost;

It is yet another object of the invention to provide an improved safety device for passenger side inflatable air bags which includes means for distinguishing between the presence of a passenger to be protected and luggage or other objects stored in the passenger area such that inadvertent activation of the associated passenger side inflatable air bag is not caused to occur.

And still other objects will be evident from the following specification, drawing, and claims.

DRAWINGS

The invention is described in more detail by reference to the drawing in which:

The FIGURE is a schematic view of the interior of a vehicle showing a passenger area and the passenger detection circuit of this invention.

SUMMARY

The objects of the invention are achieved by providing a second switch in the safety circuit for a conventional air bag safety mechanism of the type containing a delay sensor, such as an acceleration sensor, for detecting the direction and magnitude of a collision of the vehicle as identifying a triggering incident for the air bag, and a first seat switch for detecting the presence or absence of a passenger seated on a vehicle seat located in front of the inflatable air bag. The second switch is in the form of a foot switch located on the floor in front of the vehicle seat and thus makes possible the detection of a passenger who may be standing, kneeling, or sitting in the floor region in front of the vehicle seat. Thus, the presence of a passenger is detected irrespective of whether the seat switch fails to positively detect the presence of a passenger partially on or completely off the vehicle seat, and this signal is sent to the control unit to inflate the air bag when an accident is occurring.

According to the invention, two conditions must be satisfied before the propellant charge associated with the air bag is ignited and the air bag is inflated. The first condition is the detection of the triggering event by the acceleration sensor and the second condition is the presence of a passenger by either the foot and/or seat switch. According to the invention, both the foot switch and seat switch are electrically connected in parallel, thus either activation of the foot switch, or seat switch, or both switches simultaneously will result in satisfying the second condition for activating the inflatable air bag.

In a preferred embodiment, the foot switch is the form of a flat, sheet-like or mat-like element in order to provide a broad survey area in front of the vehicle seat. This flat, sheet-like element may either be arranged under the floor carpet or integrated into the floor carpet, depending on the particular type of switch which is to be used. For example, in a preferred embodiment the foot switch may be a simple electro-mechanical contact-type switch which is activated by detecting the presence of the weight of a passenger thereover. This physical-type contact switch may also be provided with known force and/or pressure measuring devices which provide a broader range of contact response other than a simple on/off response. In particular, it may make an evaluation of force and/or pressure distribution patterns to make accurate distinctions between persons and other articles stored on the floor carpet, such as luggage.

An alternate embodiment of the foot switch includes a pair of electrodes connected to a metal screen or metal loops which may be worked into the floor carpet, thus forming a condenser element which can determine the presence or absence of a person through changes in the magnetic or electric fields over the floor carpet. The floor carpet is preferably removable, such as by pulling up sideways, so that easy and quick replacement of this type of non-contact foot switch is made possible.

The control unit is also programmable with software to provide an override feature for the safety device of this invention for the conditions when the presence of a passenger is not positively detected by either the seat switch or foot switch so that the air bag will always be inflated when a triggering incident is detected by the acceleration sensor.

The air bag safety device of this invention is particularly well-suited for protection of small children who may be standing, kneeling, or sitting in the floor board region between the dashboard and the front passenger seat, but is also easily implemented for use in protecting rear-seated passengers as well.

DETAILED DESCRIPTION OF THE BEST MODE

Figure 1:
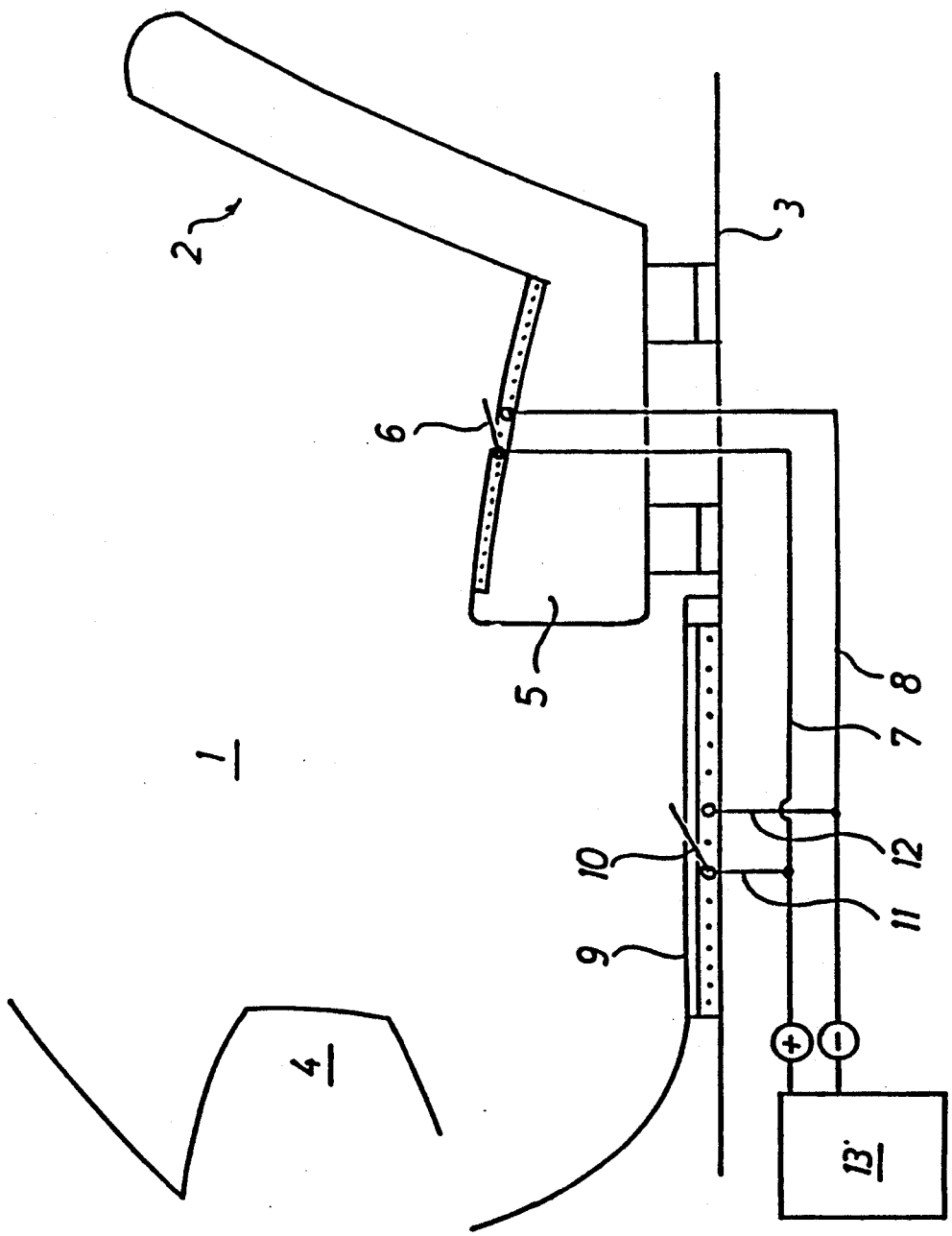

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

The Figure is a schematic view of the interior 1 of a motor vehicle wherein a passenger seat 2 is shown to be fastened to the vehicle floorboard 3 and positioned with respect to the dashboard 4 in the conventional manner. The dashboard 4 is also provided with an inflatable air bag (not shown) which is adapted to break out from the dashboard to inflate within the interior 1 in a manner to provide a recoil-free air cushion for a forward moving passenger during a collision of the appropriate severity.

The seat cushion 5 of the passenger seat 2 is also provided with a seat switch 6 for detecting the presence or absence of a passenger seated thereon. The seat switch 6 is preferably of a known flat matlike contact switch of the type shown in DE-PS 38 05 887 wherein two contact layers are separated by an intermediate elastically deformable, electrically conductive layer, which contact switch is mechanically activated when the body weight of the seated passenger compresses the intermediate layer and completes a conductive pathway for the switching circuit. This type of contact switch permits the detection of a seated passenger over a wide survey area of the seat cushion surface 5 and is especially useful in detecting a passenger who may be shifting his position in the seat or leaning forward. It is understood that a simple physical contact switch or a condenser-type switch may also be used with equally good results. The seat switch 6 is part of the electric circuit comprising the control unit 13 and lower foot switch 10 and is connected to the control unit 13 via lead wires 7 and 8.

The foot switch 10 is preferably disposed under the floor carpet 9 in the area in front of the passenger seat 2 and is connected to the control circuit 13 via lead wires 11 and 12. The foot switch 10 and seat switch 6 are connected in parallel to the control unit 13. Other elements of the electric circuit which are not shown include an acceleration sensor for the detection of a collision of the appropriate severity, and the physical connections to the triggering mechanism (i.e., propellant charge) of the inflatable air bag which is activated upon the appropriate signal generated by the control unit when all conditions for operation have been met. These other elements are well known in the art and are merely included in this discussion for completeness. The safety device of this invention operates as follows:

Condition One

A first condition for the activation of the air bag requires that a certain force of impact of the vehicle or sudden deceleration be detected by the acceleration sensor, whereby the sensor sends a signal to the control unit 13 that the air bag should be triggered. Triggering of the air bag results from the ignition of a propellant charge associated with the inflatable air bag to begin the inflation process. The control unit is program driven and is also monitoring the operational states of the floor switch 10 and the seat switch 6.

Condition Two

The second condition which must be satisfied before the air bag is activated is that either one or both of the switches are closed, i.e. either seat switch 6 or foot switch 10 are closed. This indicates that the presence of a passenger is detected in the region adjacent the dashboard area. That is, the passenger may be either seated, (i.e., seat switch 6 is closed) or may be kneeling, standing, or otherwise positioned on the floor carpet 9 in front of the seat cushion 5 (i.e., foot switch 10 is closed). In either case, the control unit 13 is signalled that a passenger is present and this information is sent to the triggering device (not shown) for the inflatable air bag so that the air bag is inflated in time to protect the passenger in the event a collision of the appropriate severity is detected by the acceleration sensor according to condition one.

While the Figure shows the safety device for the inflatable air bag of this invention in use for a front seated passenger, it is understood that the principles of this invention are applicable to all passengers within a vehicle including the rear seated passengers, irrespective of whether they are seated or positioned in the floor board area adjacent to the rear seat cushions. Thus, this invention is particularly well-suited to protect small children who may be predisposed to standing or kneeling in the floorboard areas adjacent the rear passenger seats.

In a preferred embodiment of the invention the foot contact switch is in the form of a flat, sheet-like or mat-like element so that the detection of a passenger over a broad area is achieved. Known mat-type contact switches which are activated by the weight of the passenger may be used for this purpose. The mat-type foot contact switch 10 may be arranged underneath the floor carpet or even formed into the floor carpet if desired.

It is also preferable to incorporate known force and-/or pressure measuring devices in combination with the floor contact switch to permit more precise switch response. In accordance with this type of foot contact switch, the control unit 13 may be provided with appropriate software to evaluate force and pressure distribution patterns associated with this type of foot contact switch and fore/pressure measuring device to facilitate distinctions between the presence of a passenger kneeling, standing or sitting on the floor carpet 9 and other articles such as luggage which may be stored on the floor carpet 9 for which it is not necessary to inflate the air bag. In this way it becomes possible to deactivate the air bag should only luggage be detected by the floor contact switch 10.

A first alternate embodiment for the foot switch may include the elastically deformable contact switch as disclosed in DE-PS 38 05 887. The switch may be located under the floor carpet or formed into the floor carpet. In a second alternate embodiment, the schematically shown foot switch 10 may take the form of a switch working on the non-contact principle such as the switch disclosed in DE-OS 36 35 644. In this embodiment the foot switches are preferably in the form of metal screens or metal loops which are integrated into the floor carpet to permit a determination as to the presence or absence of a person through changes measured in the magnetic or electric field set up by this switch. It is preferable to interweave these metallic screens or loops into the floor carpet so that it may be pulled up sideways for periodic removal and replacement.

An override feature to the safety device of this invention may be implemented so that the passenger side air bag will always be inflated should either the foot or seat switches fail to definitely detect the presence of a passenger when a triggering incident is present by an external accident of the appropriate severity. This override feature can be insured through known means, for example, such as with appropriate software provided to the control unit 13. Alternately the override may be the reverse, to not trigger in the presence only of luggage on the floor and/or seat.

It should be understood that various modifications within the scope of this invention can be made by one of ordinary skill in the art without departing from the spirit thereof. I therefore wish my invention to be defined by the scope of the appended claims in view of the specification as broadly as the prior art will permit.

I claim:

1. In a passenger side inflatable air bag safety device for use in motor vehicles of the type in which a control unit is provided for the intelligent triggering of a propellant charge associated with the inflatable air bag to provide a protective cushion for the passenger when two conditions have been satisfied including a first condition where a collision of a sufficient severity is occurring and a second condition where a passenger is present in a vehicle seat, and in which determination of the first condition is accomplished by an acceleration sensor connected to said control unit to sense the magnitude and direction of an impending collision of the motor vehicle and determination of the second condition is accomplished by a switch disposed in said vehicle seat for determining the presence or absence or a passenger seated on said vehicle seat, the improvement comprising:
   a) means for detecting the presence of a person standing, kneeling or sitting on a floor mat region in front of said passenger vehicle seat;
   b) said detecting means is disposed in association with a floor mat and sends a signal to said control unit when a passenger is present in said floor mat region so that said control unit will activate the ignition of the propellant charge for said passenger side air bag upon satisfaction of said first condition;
   c) said detecting means is electrically connected in parallel with said first seat switch so that said detecting means signals said control unit independently of said first seat switch; and
   d) said control unit includes a safety override means for triggering the propellant charge of said passenger side air bag for an operation condition where said detecting means does not confirm the presence of a passenger in the region adjacent said passenger seat and said first seat switch does not confirm the presence of a passenger seated on said vehicle seat when said acceleration sensor has signaled said control unit of an impending collision above a preselected severity level.

2. An improved passenger side inflatable air bag safety device as in claim 1 wherein said detecting means includes a flat, mat-shaped, mechanical actuable contact switch having a contact surface area sufficient to span said floor mat region in front of said passenger seat.

3. An improved passenger side inflatable air bag safety device as in claim 2 wherein:
   a) said mechanical actuable contact switch includes means for measuring the force and pressure exerted on said contact switch and permitting said contact switch to close after a pre-set threshold force or pressure value is surpassed.

4. An improved passenger side inflatable air bag safety device as in claim 3 wherein said force and pressure measuring means includes at least one recognition sensor to distinguish between force and pressure distribution patterns associated with a passenger, and force and pressure distribution patterns associated with articles placed on said floor mat region.

5. An improved passenger side inflatable air bag safety device as in claim 4 wherein said contact switch is disposed under a floor carpet covering associated with said floor mat region.

6. An improved passenger side inflatable air bag safety device as in claim 4 wherein said contact switch is formed into a floor carpet covering associated with said floor mat region.

7. An improved passenger side inflatable air bag safety device as in claim 1 wherein:
   a) said detecting means includes a tri-layer contact switch of the type having at least two spaced apart, contact surfaces interposed by a elastically deformable and electrically insulating layer, said tri-layer contact switch completing an electrically conductive pathway when said contact surfaces are brought together under the weight of a passenger; and
   b) said contact surfaces having a surface area sufficient to span said floor mat region in front of said passenger seat.

8. An improved passenger side inflatable air bag safety device as in claim 7 wherein:
   a) said tri-layer contact switch includes means for measuring the force and pressure exerted on said tri-layer contact switch and permitting said tri-layer contact switch to close after a pre-set threshold value is surpassed.

9. An improved passenger side inflatable air bag safety device as claim 8 wherein said force and pressure measuring means includes at least one recognition sensor to distinguish between force and pressure distribution patterns associated with a passenger and force and pressure distribution patterns associated with articles placed on said floor mat area.

10. An improved passenger side inflatable air bag safety device as in claim 9 wherein said contact switch is disposed under a floor carpet portion associated with said floor mat region.

11. An improved passenger side inflatable air bag safety device as in claim 9 wherein said contact switch is formed onto a floor carpet portion associated with said floor mat region.

12. An improved passenger side inflatable air bag safety device as in claim 1 wherein:
   a) said detecting means includes a condenser switch comprising a pair of electrodes connected to a sheet surface of interconnecting metallic elements for running an electrical current therethrough;
   d) said condenser switch detecting changes in the electric and magnetic fields adjacent said floor mat region which correspond to the presence or absence of a passenger positioned thereover; and c) said condenser switch having a surface area sufficient to span said floor mat region in front of said passenger seat.

13. An improved passenger side inflatable air bag safety device as in claim 12 wherein:
   a) said metallic elements are in the form of a metallic screen; and
   b) said metallic screen is formed into a floor carpet portion associated with said floor mat region.

14. An improved passenger side inflatable air bag safety device as in claim 13 wherein said floor carpet is removable by lifting up sideways.

15. An improved passenger side inflatable air bag safety device as in claim 12 wherein:
   a) said metallic elements are in the form of metallic loops; and
   b) said metallic loops are formed into a floor carpet portion associated with said floor mat region.

16. An improved passenger side inflatable air bag safety device as in claim 15 wherein said floor carpet is removable by lifting up sideways.

* * * * *